United States Patent [19]
McJunkin

[11] Patent Number: 5,907,687
[45] Date of Patent: May 25, 1999

[54] POWER SHUTDOWN APPARATUS

[75] Inventor: Timothy R McJunkin, Cypress, Tex.

[73] Assignee: Compaq Computer Corporation, Houston, Tex.

[21] Appl. No.: 08/701,721

[22] Filed: Aug. 22, 1996

[51] Int. Cl.$^6$ ............. G06F 13/00; H02H 3/00; H01R 13/64
[52] U.S. Cl. ............. 395/283; 395/282; 361/42; 439/377; 439/378
[58] Field of Search ............. 361/42; 395/750, 395/282; 439/378; 363/65

[56] References Cited

U.S. PATENT DOCUMENTS

| | | | |
|---|---|---|---|
| 5,126,910 | 6/1992 | Windsor et al. | 361/42 |
| 5,272,584 | 12/1993 | Austruy et al. | 361/58 |
| 5,391,091 | 2/1995 | Nations | 439/378 |
| 5,550,729 | 8/1996 | Wissell | 363/65 |
| 5,566,339 | 10/1996 | Perholtz et al. | 395/750 |
| 5,586,270 | 12/1996 | Rotier et al. | 395/282 |

*Primary Examiner*—Ayaz R. Sheikh
*Assistant Examiner*—Frantz B. Jean
*Attorney, Agent, or Firm*—Jenkens & Gilchrist

[57] ABSTRACT

A computer system having a power supply, a backplane board and a system board includes a power supply shutdown apparatus. When an interlock pin disposed on an edge connector of the system board is not seated properly in a corresponding interlock-pin-receptacle forming a portion of a system board socket disposed on the backplane board, a shutdown circuit is actuated to produce a shutdown signal which is used for electrically isolating the power supply from the system board.

7 Claims, 4 Drawing Sheets

POWER SHUTDOWN APPARATUS

BACKGROUND OF THE INVENTION

1. Technical Field of the Invention

The present invention relates to power supply shutdown systems and, in particular, to a power supply shutdown apparatus adapted for use in a computer system.

2. Description of Related Art

Modularization is a much sought-after design paradigm in the field of computer systems. In personal computers, especially, modularization has resulted in a standardized motherboard having a processor unit, on-board memory, and a host of expansion slots into which are plugged various expansion cards providing such enhanced functionality as telecommunications, disk storage and improved video.

While modularization of stand-alone computers has resulted in standard features such as those described above, the fast-growing field of network computer systems has engendered a new level of modularization altogether. It has become increasingly clear to many computer designers that having a single motherboard with a system bus thereon in a computer that is networked in a server-client relationship with other computers (known as "clients") places severe design and performance constraints on that computer (known as a "server"). Many designers of server architectures have thus adopted a design philosophy of modularizing the motherboard itself into component system boards, all of which may be plugged into system board slots provided preferably on a backplane board having interconnect circuitry. Hence, it is envisioned in such a paradigm to have a backplane board with system board slots for, for example, a processor board containing at least a processor unit, various memory modules and possibly a few expansion slots for added functionality; and at least a port board containing a host of input/output ports.

It can be readily appreciated that modularization of a "motherboard" in a server into constituent system boards can result in increased serviceability and performance criteria. However, such "system-level" modularization is not without some drawbacks. One possible problem is that a user might inadvertently remove a system board while the server is still powered up. Because of the topography and lay-out of high-voltage bus traces in a high-performance bus system, such as, for example, a peripheral component interconnect ("PCI") bus system, any misalignment between a system board connector and the corresponding system board socket on the backplane will increase the probability of destroying some of the voltage-sensitive devices whose connectors are positioned near the high-voltage bus traces. A similar problem might also arise during the initial power up of the computer system when the modular system boards are not properly seated in the backplane board in the first place.

It is therefore advantageous to provide a power supply shutdown apparatus adapted for use in a computer having modularized system boards wherein when one of the system boards is misaligned, or missing, for any reason, the power supply to that system board is shut off. Although various current power supply shutdown systems have been extant for sometime, no such system is known to have all of the advantages and novel features of the system described, and claimed, hereinbelow.

SUMMARY OF THE INVENTION

The present invention overcomes the above-identified problems as well as other shortcomings and deficiencies of existing technologies by providing a power shutdown apparatus adapted for use in a computer system of the type having a power supply, a backplane board and a system board. In one aspect of the present invention, when an interlock pin disposed on the edge connector of the system board is not seated properly in a corresponding interlock-pin-receptacle forming a portion of a system board socket of the backplane, a shutdown circuit is actuated to produce a shutdown signal which is asserted HIGH for electrically isolating the power supply from the system board. In a further aspect, the shutdown circuit of the present invention includes a diode.

The present invention further provides a power shutdown apparatus wherein an interlock pin disposed on at least one of the processor board and the input/output board is electrically connectable to ground when either the processor board or the input/output board is removably inserted without any misalignment in a corresponding socket disposed on the backplane board. In a still further aspect, the interlock pin is shortened by a pre-determined portion relative to the length of the rest of the connector pins provided on the edge connector of either the processor board or the input/output board.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
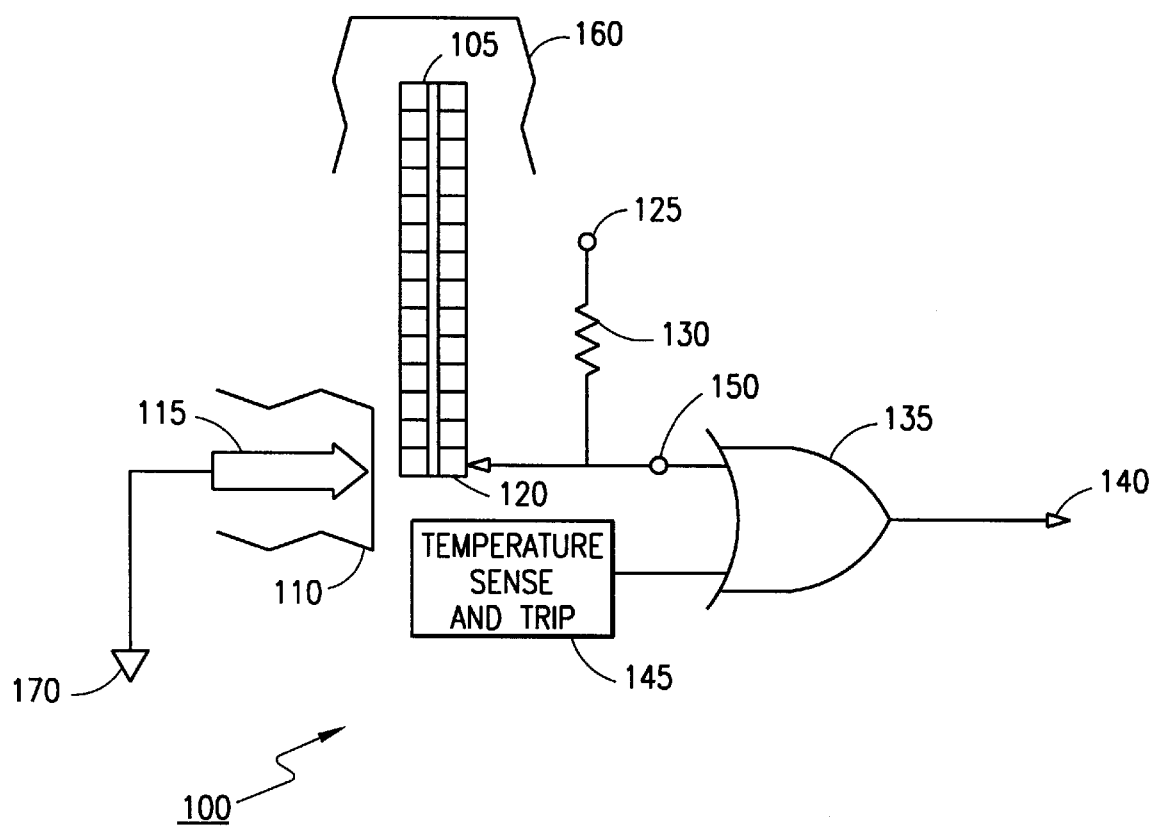
FIG. 1 illustrates a schematic of a first exemplary embodiment of the present invention.

Referring now to the drawings wherein like or similar elements are designated with identical reference numerals throughout the several views, and wherein the various elements depicted are not necessarily drawn to scale, and, in particular, to FIG. 1, there is shown, in schematic form, a first exemplary embodiment 100 of the present invention. In FIG. 1, reference numeral 160 refers to a backplane board having a system board socket 105. The system board socket 105 is adapted to receive an exemplary system board 110. The exemplary system board 110 preferably has a plurality of connector pins, for example, an interlock pin 115, on one of its edges such that the system board 110 is removably insertable in the system board socket 105.

Continuing to refer to FIG. 1, the system board socket 105 comprises an interlock-pin-receptacle 120. Although it is shown in this FIG. that the interlock-pin-receptacle 120 is located at one end of the system board socket 105, it will be understood upon reference hereto that it is not essential for the practice of this invention to place the interlock-pin-receptacle 120 at one end of the system board socket 105. However, as will be discussed hereinbelow with reference to other FIGS., the beneficial use of the present invention may be optimized by placing the interlock pin 115 and the corresponding interlock-pin-receptacle 120 near the ends rather than in the middle of the edge of the system board 110 and the system board socket 105, respectively.

Still continuing to refer to FIG. 1, the interlock pin 115 is electrically connectable to a ground 170 when the interlock pin 115 is seated properly without any misalignment in the interlock-pin-receptacle 120. As can be readily appreciated, the interlock pin 115 and the interlock-pin-receptacle will be electrically grounded when the system board 110 is inserted without any misalignment in the system board socket 105 provided on the backplane board 160. Reference numeral 135 refers to a logic circuit with inputs from a temperature sense and trip block 145 and a shutdown node 150. In accordance with the teachings of the present invention, the shutdown node 150 is electrically connected to the interlock-pin-receptacle 120 and a voltage supply 125 via a resistor 130. The logic circuit 135 is so designed that its output, a shutdown signal 140, is asserted HIGH when either the shutdown node 150 or the input from the temperature sense and trip block 145 is also asserted HIGH. It is obvious that the shutdown signal 140 is also asserted HIGH when both the inputs to the logic circuit are asserted HIGH. Further, as is known in the art, the logic circuit 135 may be implemented in numerous conventional ways.

The temperature sense and trip block 145 is electrically connected to a processor (not shown) and produces a HIGH signal when the temperature of the processor reaches a pre-determined threshold. The shutdown signal 140 is used according to the present invention in a feedback arrangement (not shown) to disconnect a power supply (not shown) from the exemplary system board 110.

In the general operation, when a computer system in which the present invention may be gainfully employed is powered up, the backplane board 160 and the system board 110 draw power from the power supply and the computer system enters its normal operating mode, if the system board 110 is inserted without any misalignment at the system board socket 105. On the other hand, if there is a misalignment between the system board 110 and the system board socket 105 on the backplane board 160 during the power up, or if there is a misalignment during the normal operation of the computer system, caused by either accidental removal of the system board 110 or by improper insertion thereof during a maintenance check, the shutdown node 150 will be pulled HIGH to the voltage supply 125 because the voltage supply 125 can no longer be shunted to the ground 170 via the interlock pin 115. The shutdown signal 140 will therefore be asserted HIGH, which is then used to electrically disconnect the power supply from the misaligned system board 110. It can be appreciated that by so isolating the system board 110 electrically from the power supply because of a misalignment, the electronic devices (not shown in this FIGURE) on the system board 110 will not be destroyed as a result of improper signal loading on the rest of the plurality of the connector pins.

Favorable results have been obtained by using a voltage supply of about 12.0 volts in a presently preferred exemplary embodiment of the present invention. It should be understood, however, that the scope of the present invention is in no way limited to this voltage and one skilled in the art may practice the present invention in accordance with the novel teachings contained herein with any range of voltage suitable for a user-specific application, for example, a 1.5 V application, provided at the voltage supply node 125.

Figure 2:
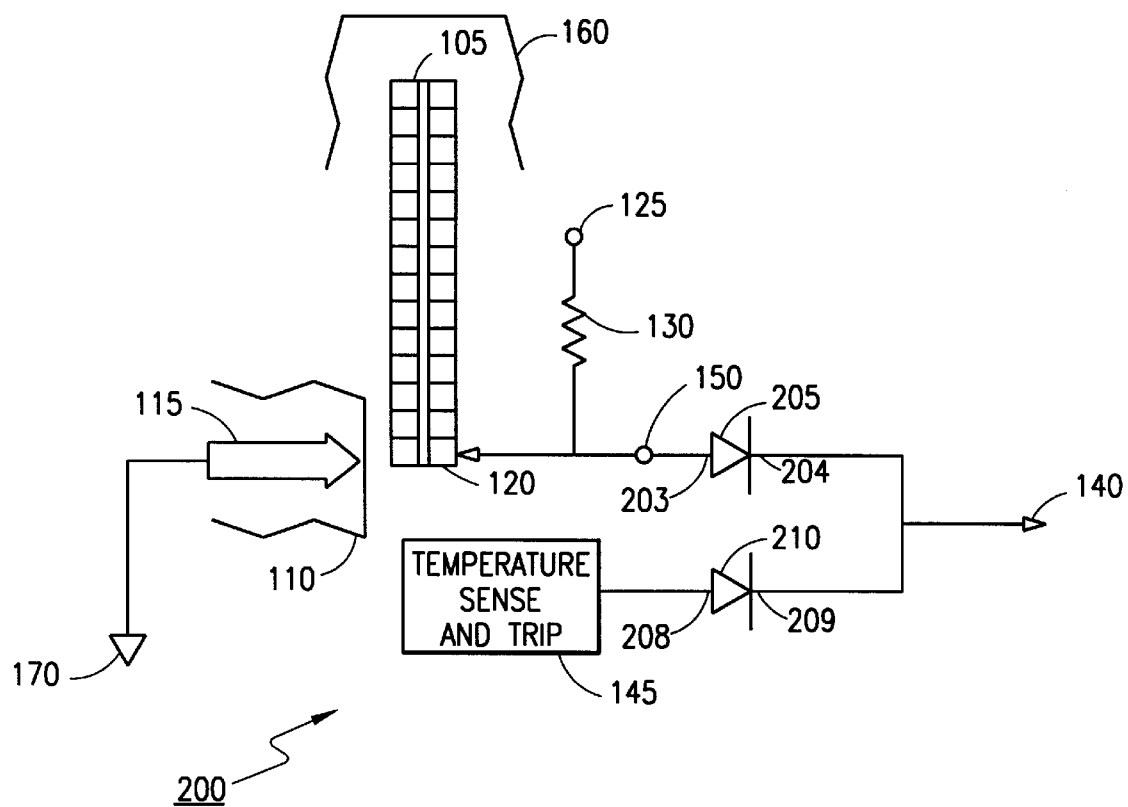
FIG. 2 illustrates a schematic of a second exemplary embodiment of the present invention.

Referring now to FIG. 2, therein is depicted in schematic form a second exemplary embodiment 200 of the present invention. Although embodiment 200 (of FIG. 2) is very similar to embodiment 100 (of FIG. 1), it may be that the logic circuit 135 of FIG. 1 is replaced in FIG. 2 with a diode logic arrangement having a first diode 205 and a second diode 210. A positive terminal 203 of the first diode 205 is electrically connected to the shutdown node 150 such that the first diode 205 will be forward-biased when the shutdown node 150 is pulled to HIGH on account of a misalignment between the interlock pin 115 of the system board 110 and the interlock-pin-receptacle 120 of the system board socket 105. A positive terminal 208 of the second diode 210 is connected to the temperature sense and trip block 145 so that the second diode 210 will be forward-biased should the trip signal be asserted HIGH. The negative terminal 204 of the first diode 205 and the negative terminal 209 of the second diode 210 are tied together where the shutdown signal 140 may be asserted. It can be appreciated by those skilled in the art upon reference hereto that providing the diode-pair, 205 and 210, can provide certain advantages because the switching times associated with diodes 205 and 210 are faster than those associated with transistor logic, and because the diodes 205 and 210 can be electrically connected to higher voltages, for example, the 12-volt power rails in some of the high-performance bus systems, without being destroyed.

Figure 3:
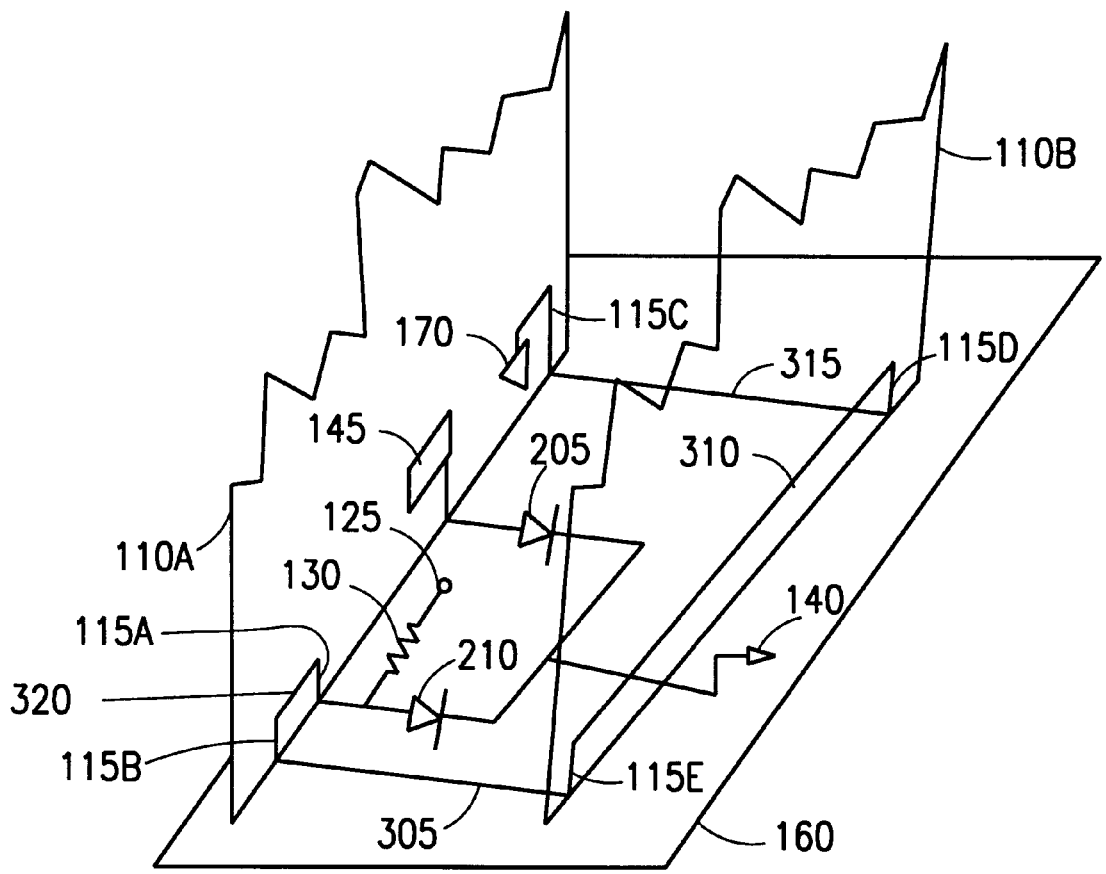
FIG. 3 depicts an arrangement of two system boards in an exemplary computer system in accordance with the teachings of the present invention.
Figure 3:
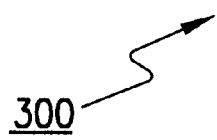

FIG. 3 depicts an arrangement, generally designated with reference numeral 300, of two system boards in an exemplary computer system in accordance with the teachings of the present invention. An input/output board 110A and a processor board 110B are removably insertably coupled to the backplane board 160. The input/output board 110A preferably has three interlock pins, 115A, 115B, and 115C, of which the interlock pin 115C is electrically connectable to the ground 170, in addition to the rest of the connector pins (not shown). The input/output board 110A may contain conventional input/output devices and expansion slots (not shown), all electrically connected to a bus, for example, a peripheral component interconnect ("PCI") bus (not shown). The input/output board 110A is depicted to also have the temperature sense and trip block 145 that produces a temperature trip signal as discussed hereinabove. The backplane board 160 preferably contains the diode-pair, 205 and 210, and the voltage supply 125 that is capable of supplying 12 volts. The processor board 110B may preferably contain a processor (not shown), additional expansion slots (not shown), memory (not shown) and bus-to-bus bridge devices (not shown). The processor board 110B preferably has two interlock pins, 115D and 115E, in addition to the rest of the connector pins (not shown).

Continuing to refer to FIG. 3, the interlock pins 115A, 115B, 115C, 115D and 115E are electrically connectable together via a connector 320 disposed on the input/output board 110A; a connector 305 disposed on the backplane board 160; a connector 310 disposed on the processor board 110B; and a connector 315 disposed on the backplane board 160. The interlock pin 115C is also electrically connectable to the ground 170. It can be appreciated that if either, or both, of the boards 110A and 110B, is not fully inserted, or unplugged, or misaligned in any way, the voltage shunt path via the connectors 320, 305, 310, and 315 will be broken and the diode 210 will be forward-biased, thereby asserting a HIGH shutdown signal 140. As described hereinabove, the shutdown signal 140 then electrically isolates either, or both, of the boards 110A and 110B, depending upon actual implementation.

It can be readily appreciated by those skilled in art upon reference hereto that the teachings above regarding a two board system could also be extended to systems including three or more boards.

Figure 4:
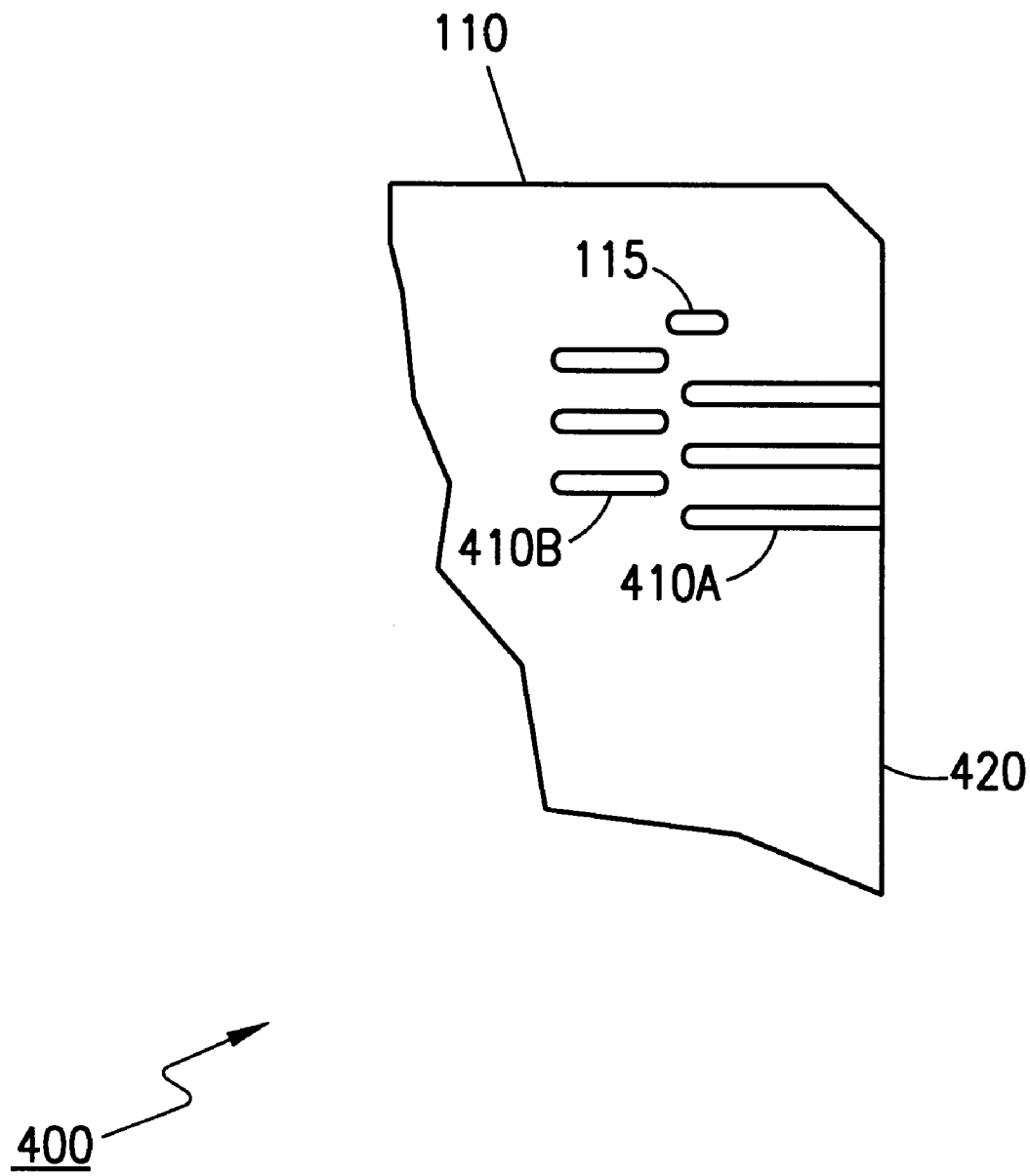
FIG. 4 depicts an enlarged detail of an exemplary system board having an interlock pin.

Referring now to FIG. 4, therein is shown, generally designated by reference numeral 400, an enlarged detail of a connector edge 420 of the system board 110. The connector edge 420 preferably has a plurality of connector pins, for example, 410A and 410B, including the interlock pin 115. Although it is shown herein that the presently preferred interlock pin 115 is shorter than the rest of the connector pins, 410A and 410B, by a pre-determined portion, it is possible to have an interlock pin with the same length as that of the rest of the connector pins. However, it can be readily appreciated that a shorter interlock pin can be more easily misaligned should there be any misalignment between the connector edge 420 and the system board socket 105 (shown in FIGS. 1 and 2).

Moreover, although a single interlock pin 115 is shown to be disposed near one end of the connector edge 420, it can be understood that a plurality of such interlock pins, disposed at variable positions along the connector edge 420, may be provided within the scope of the present invention. For example, it is clear that having two interlock pins, maximally separated from each other, will be more efficient in detecting a misalignment between the connector edge 420 and the system board socket 105 (shown in FIGS. 1 and 2) than either a single interlock pin or two interlock pins positioned near the middle of the connecter edge 420.

Although only certain embodiments of the apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system having a processor board with a processor, a backplane board, a power source and an input/output board, the processor board and the input/output board being removably insertable in respective sockets disposed on the backplane board, the system comprising:

an interlock pin disposed on at least one of the processor board and the input/output board, said interlock pin being electrically connectable to a ground terminal when either the input/output board or the processor board is removably inserted without misalignment in the socket disposed on the backplane board;

a receptacle for said interlock pin, said receptacle comprising a portion of the socket disposed on the backplane board;

a first diode, said first diode being electrically connectable to one of said receptacle and a voltage supply;

a second diode, said second diode being electrically connected to a trip circuit, said trip circuit being actuatable upon reaching a pre-determined temperature limit of the processor; and wherein said first diode and said second diode are electrically tied together for providing a shutdown signal.

2. The system as recited in claim 1, wherein:

said voltage supply comprises a voltage source of at least 1.5 volts.

3. The system as recited in claim 1, wherein:

said shutdown signal disconnects the power supply from at least one of the input/output board and the processor board.

4. A computer system having a power supply, a backplane board and a system board, said computer system comprising:

a system board socket disposed on the backplane board, said system board socket for removably receiving the system board, said system board socket comprising an interlock-pin-receptacle coupled to a voltage supply;

an interlock pin disposed on the system board, wherein said interlock pin is electrically connected to a ground terminal, said interlock pin for shunting said voltage supply to said ground terminal when the system board is received without a misalignment at said system board socket; and a shutdown circuit electrically connected to said voltage supply and said interlock-pin-receptacle, said shutdown circuit for detecting an open circuit between said interlock pin and said ground terminal, said shutdown circuit including a logic element which receives a first signal from said interlock-pin-receptacle when said interlock pin is misaligned with said interlock-pin-receptacle and a second signal indicative of a temperature trip associated with a processor, said logic element configured to produce a shutdown signal responsive to at least one of said first and second signals.

5. The computer system as recited in claim 4, wherein:

said voltage supply comprises a voltage source of at least 1.5 volts.

6. The computer system as recited in claim 4, wherein:

said shutdown signal disconnects the power supply from the system board.

7. The computer system as recited in claim 4, wherein:

said shutdown circuit comprises at least one diode.

* * * * *